(12) United States Patent
Motohashi (10) Patent No.: US 8,703,316 B2
(45) Date of Patent: Apr. 22, 2014

(54) BATTERY MODULE

(75) Inventor: Toshiyuki Motohashi, Funabashi (JP)

(73) Assignees: Nissan Motor Co., Ltd., Yokohama (JP); Calsonic Kansei Corporation, Saitama (JP)

( * ) Notice: Subject to any disclaimer, the term of this patent is extended or adjusted under 35 U.S.C. 154(b) by 122 days.

(21) Appl. No.: 13/322,050

(22) PCT Filed: Aug. 25, 2010

(86) PCT No.: PCT/IB2010/002080
§ 371 (c)(1),
(2), (4) Date: Nov. 22, 2011

(87) PCT Pub. No.: WO2011/030194
PCT Pub. Date: Mar. 17, 2011

(65) Prior Publication Data
US 2012/0070718 A1 Mar. 22, 2012

(30) Foreign Application Priority Data

Sep. 11, 2009 (JP) .................................. 2009-210059

(51) Int. Cl.
*H01M 2/02* (2006.01)
*H01M 2/10* (2006.01)
(52) U.S. Cl.
USPC .............. 429/99; 429/151; 429/157; 429/163
(58) Field of Classification Search
USPC .............. 429/97, 99, 121, 151, 156, 157, 163
See application file for complete search history.

(56) References Cited

U.S. PATENT DOCUMENTS

| | | | |
|---|---|---|---|
| 6,555,264 B1 * | 4/2003 | Hamada et al. | ................ 429/156 |
| 6,645,668 B2 * | 11/2003 | Etou | .......................... 429/163 X |
| 7,803,482 B2 * | 9/2010 | Higashino et al. | ......... 429/156 X |
| 7,816,029 B2 | 10/2010 | Takamatsu et al. | |
| 8,124,270 B2 * | 2/2012 | Asahina et al. | ............ 429/157 X |

(Continued)

FOREIGN PATENT DOCUMENTS

| | | |
|---|---|---|
| CN | 200969361 Y | 10/2007 |
| CN | 101136457 A | 3/2008 |

(Continued)

OTHER PUBLICATIONS

An English translation of the Russian Decision on Grant of corresponding Russian Application No. 2012114157/07 (021403), issued on May 31, 2013.

(Continued)

*Primary Examiner* — Stephen J. Kalafut
(74) *Attorney, Agent, or Firm* — Global IP Counselors, LLP (57) ABSTRACT

A battery module is provided with a battery cell and a case. The case houses the battery cell. The case includes a first main face, a second main face, a first battery module coupling structure and a first elastically deforming structure. The first battery module coupling structure is arranged and configured to retain a first additional battery module over the first main face. The first elastically deforming structure is arranged and configured with respect to the first main face to elastically deform inward towards the second main face upon stacking the first additional battery module onto the first main face while the first additional battery module is retained to the first main face of the case by the first battery module coupling structure.

20 Claims, 8 Drawing Sheets (56) References Cited

U.S. PATENT DOCUMENTS

| | | |
|---|---|---|
| 2010/0021802 A1 | 1/2010 | Yang et al. |
| 2010/0151306 A1* | 6/2010 | Fredriksson et al. ........... 429/99 |
| 2012/0129038 A1* | 5/2012 | Lim et al. ...................... 429/156 |

FOREIGN PATENT DOCUMENTS

| | | |
|---|---|---|
| CN | 101395739 A | 3/2009 |
| JP | 2004-055346 A | 2/2004 |
| JP | 2005-293893 A | 10/2005 |
| JP | 2005-293907 A | 10/2005 |
| JP | 2007-066625 A | 3/2007 |
| JP | 2007-103344 A | 4/2007 |
| RU | 2335827 C1 | 10/2008 |
| RU | 2336600 C1 | 10/2008 |

OTHER PUBLICATIONS

A Written Opinion of the International Search Authority for International Application No. PCT/IB2010/002080, dated Dec. 6, 2010, mailed Dec. 14, 2010.

An English translation of the Chinese Office Action for the corresponding Chinese patent application No. 201080034792.4 issued on Dec. 20, 2013.

* cited by examiner

BATTERY MODULE

CROSS-REFERENCE TO RELATED APPLICATIONS

This application is a U.S. National stage of International Application No. PCT/IB2010/002080, filed Aug. 25, 2010, which claims priority to Japanese Patent Application No. 2009-210059, filed on Sep. 11, 2009. The entire disclosure of Japanese Patent Application No. 2009-210059 is hereby incorporated herein by reference.

BACKGROUND

1. Field of the Invention

The present invention generally relates to a battery module. More specifically, the present invention relates to battery modules that are stacked on one another.

2. Background Information

Sometimes battery modules are arranged in a stack with end plates provided on both ends of the stack of the battery modules to form a battery module cluster or assembly. The end plates are usually fastened at each of the four corners with a fastener that includes a fastening bolt and a nut arrangement such that a uniform surface pressure is applied to the battery modules. An example of this type of arrangement is disclosed in Japanese Laid-Open Patent Publication No. 2007-66625.

SUMMARY

It has been discovered that with conventional battery modules, as described above, the fastening bolts and the nuts are provided as separate components to apply a uniform pressure. Consequently, there is a concern that the number of parts and the cost will increase.

In view of the state of the known technology, one aspect of the present disclosure is to provide a battery module in which a uniform surface pressure can be applied without increasing the number of parts.

The aforementioned aspect can be achieved by providing a battery module that basically comprises a battery cell and a case. The case houses the battery cell. The case includes a first main face, a second main face, a first battery module coupling structure and a first elastically deforming structure. The first battery module coupling structure is arranged and configured to retain a first additional battery module over the first main face. The first elastically deforming structure is arranged and configured with respect to the first main face to elastically deform inward towards the second main face upon stacking the first additional battery module onto the first main face while the first additional battery module is retained to the first main face of the case by the first battery module coupling structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
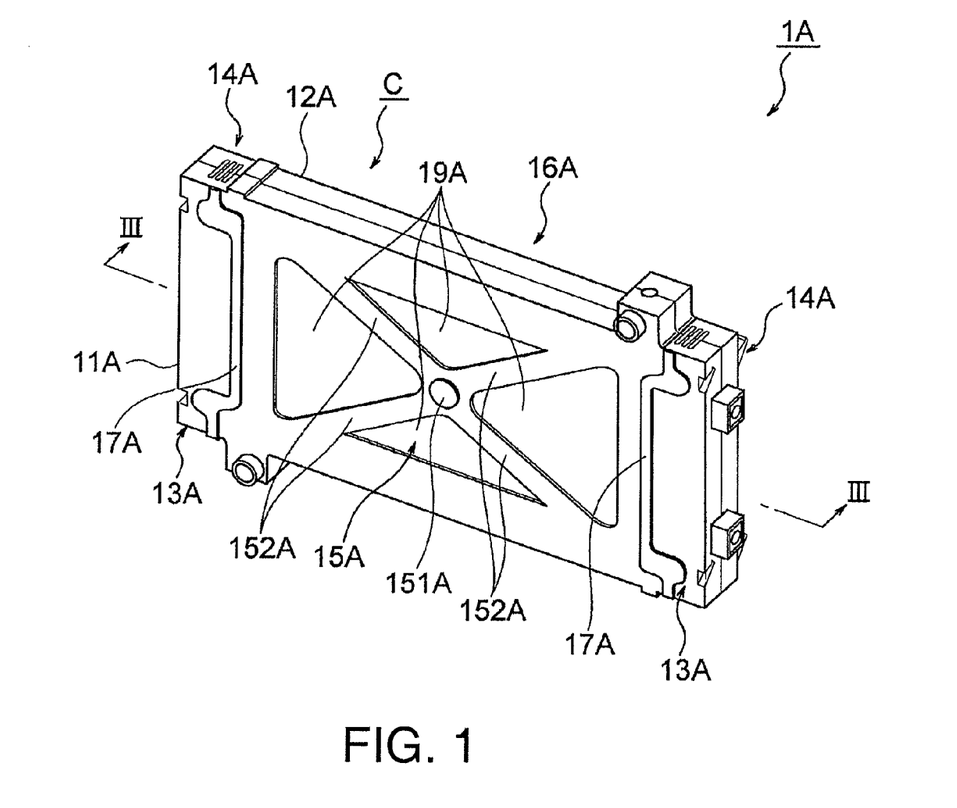
FIG. 1 is a perspective view of a single battery module in accordance with a first illustrated embodiment.
Figure 2:
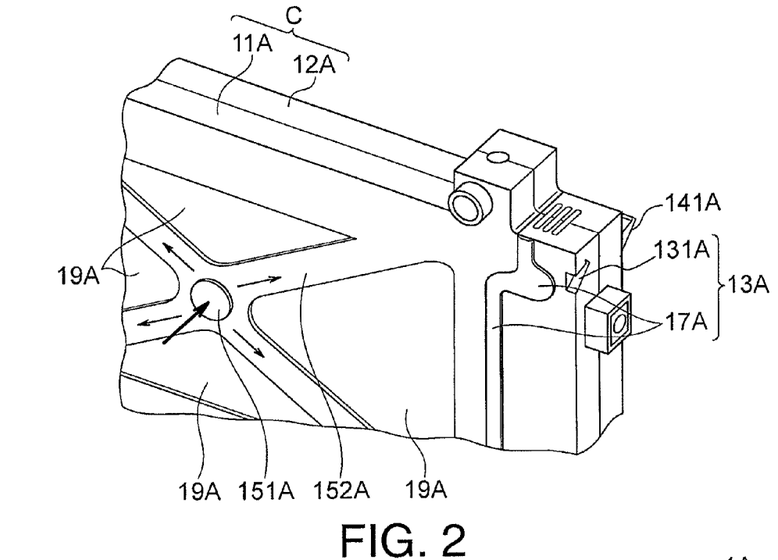
FIG. 2 is an enlarged partial perspective view of a corner portion of the battery module illustrated in FIG. 1.
Figure 3:
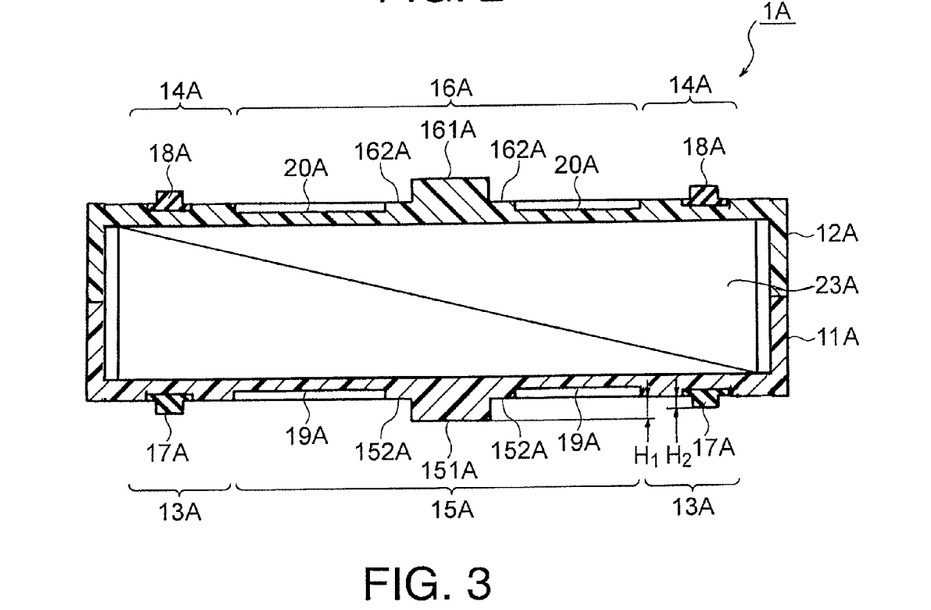
FIG. 3 is a longitudinal cross sectional view of the battery module illustrated in FIG. 1 as seen along the section line of FIG. 1.

Referring initially to FIGS. 1 to 3, a single battery module 1A is illustrated in accordance with a first embodiment. FIG. 1 is a perspective view of the single battery module 1A. FIG. 2 is an enlarged partial perspective view of a corner portion of the battery module 1A illustrated in FIG. 1. FIG. 3 is a longitudinal cross sectional view of the battery module 1A illustrated in FIG. 1 as seen along the section line of FIG. 1.

Figure 4:
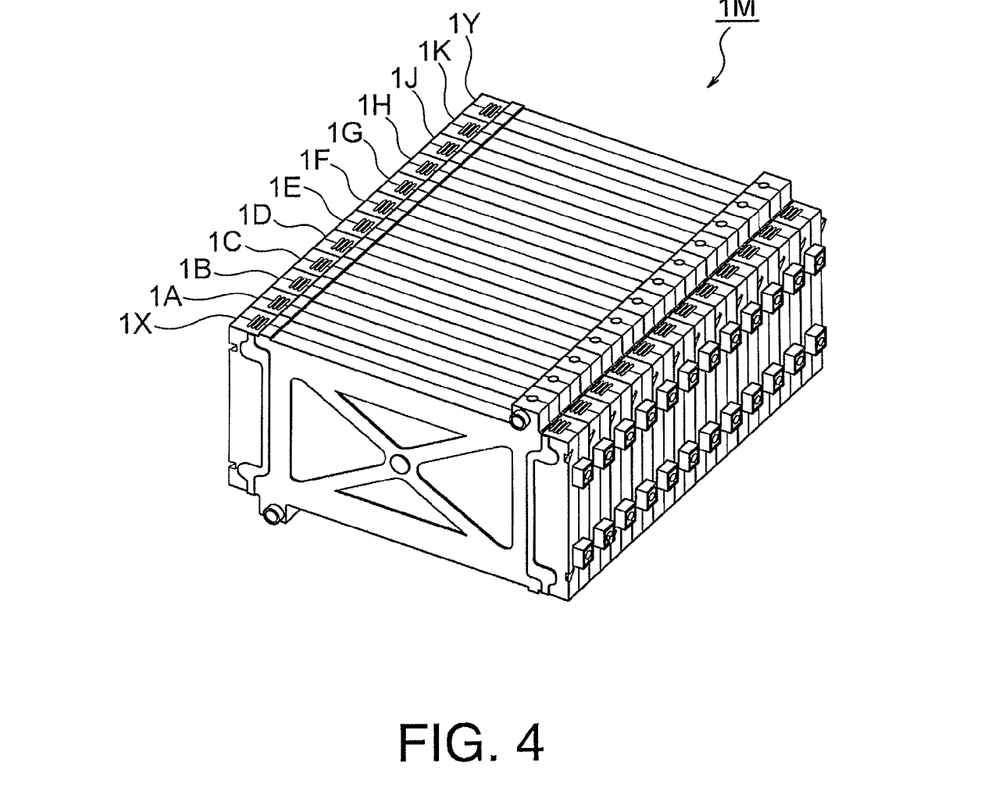
FIG. 4 is a perspective view of a battery module cluster or assembly comprising a plurality of the battery modules illustrated in FIG. 1.

In this embodiment, as seen in FIG. 4, the battery module 1A is stacked with additional battery modules 1B to 1H, 1J, 1K, 1X and 1Y that are stacked on one another to form a battery module cluster or assembly 1M. The battery modules 1A to 1H, 1J, 1K, 1X and 1Y have main faces that are overlapping in a battery module stacking direction as shown in FIG. 4. In this embodiment, the battery module cluster 1M includes twelve battery modules. However, more or fewer battery modules can be used to form a battery module cluster as needed and/or desired. The battery module cluster or assembly 1M serves as an electric power source for a drive motor of a vehicle. Each of the battery modules 1A to 1H, 1J, 1K, 1X and 1Y has a positive terminal (e.g., upper one in FIG. 4) and a negative terminal (e.g., lower one in FIG. 4), which are located on one edge face of the case C between the main faces of the case C.

The battery module 1A. Each of the other twelve battery modules 1A to 1H, 1J, 1K, 1X, and 1Y shown in FIG. 4 have the same structure. Since the twelve battery modules 1A to 1H, 1J, 1K, 1X, and 1Y shown in FIG. 4 all have the same structure, the battery module 1A in the second position from the left in FIG. 4 will now be explained as a representative example of all of the other battery modules 1B to 1H, 1J, 1K, 1X, and 1Y. Moreover, corresponding parts of the battery modules 1A to 1H, 1J, 1K, 1X, and 1Y are indicated with the same numeral and a letter corresponding to the position of the particular battery module. For example, the battery module 1A basically has a case C formed of a first case piece 11A and a second case piece 12A, with the second case piece 12A being basically symmetrical to the case piece 11A. Thus, for example, the battery module 1X has a corresponding first case piece 11X and a second case piece 12X. In some cases, corresponding parts of the other battery modules are omitted in the drawings for brevity.

As seen in FIGS. 1 to 3, for example, the two case pieces 11A and 12A are fitted together such that a dividing line there-between is located in a middle portion of a side face of the case C. Each of the case pieces 11A and 12A is made of a plastic resin material. When the two case pieces 11A and 12A are fitted together they form the case C. The first case piece 11A includes a first battery module coupling structure 13A at each end, while the second case piece 12A includes a second battery module coupling structure 14A at each end. The first and second battery module coupling structures 13A and 14A mate together to retain the case pieces 11A and 12A together as a unit. The case C of each of the battery modules 1A to 1H, 1J, 1K, 1X, and 1Y houses a single laminated battery cell body 23A, which is made up of either single battery cell, or a plurality of thin battery cells stacked on one another in the thickness or stacking direction of the battery cells with the battery cells contacting each other in the stacked direction.

Figure 6:
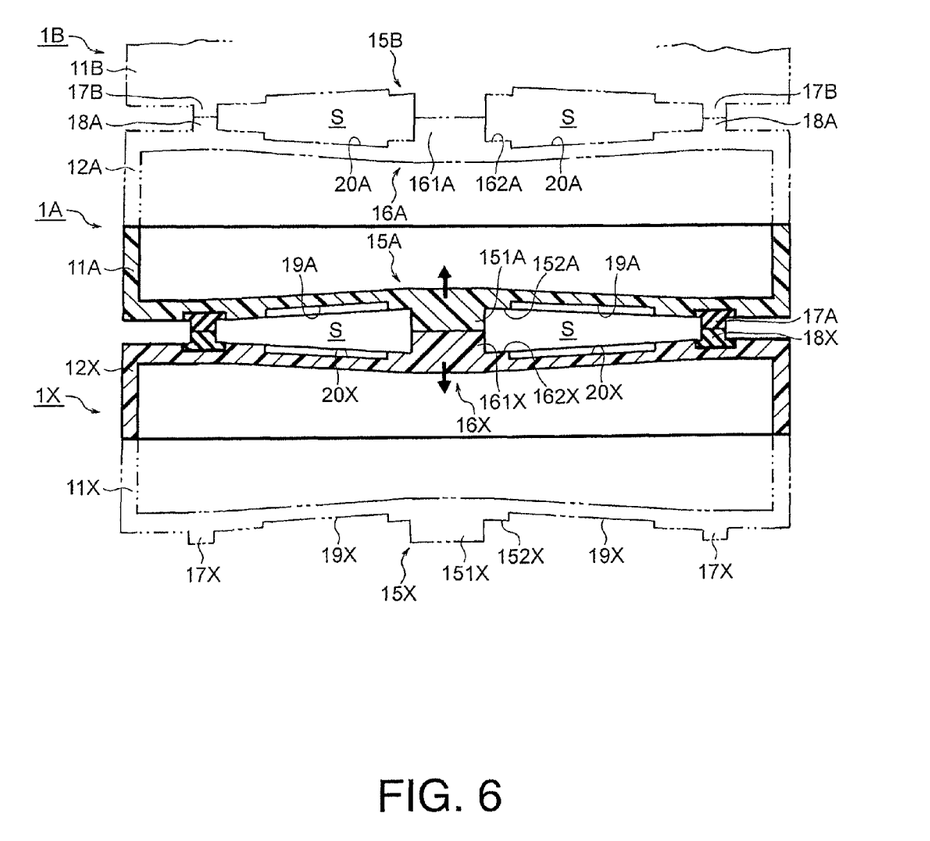
FIG. 6 is a longitudinal cross sectional view a portion of the battery module cluster comprising the battery modules illustrated in FIG. 1 stacked on one another.

As seen in FIGS. 1 and 3, the battery module 1A has a first elastically deforming structure 15A formed on the first case piece 11A and a second elastically deforming structure 16A formed on the second case piece 12A. The first battery module coupling structure 13A of the first case piece 11A includes a pair of first buffer parts 17A (e.g., rubber abutments) arranged at opposite corners, while the second battery module coupling structure 14A of the second case piece 12A includes a pair of second buffer parts 18A (e.g., rubber abutments) arranged at opposite corners. As seen in FIG. 6, the elastically deforming structures 15A and 16A elastically deform when the battery module 1A is coupled to the battery modules 1X and 1B with the corresponding ones of the first buffer parts 17A contacting the corresponding ones of the second buffer parts 18A. As a result, separate parts are not required for stacking battery modules 1A to 1H, 1J, 1K, 1X, and 1Y and a uniform surface pressure can be applied to the battery modules 1A to 1H, 1J, 1K, 1X, and 1Y by the elastic deformation of the elastically deforming structures 15A and 16A.

In particular, in this illustrated embodiment, the first case piece 11A includes a first protrusion 151A, a plurality (four) of first protruding beads or ribs 152A, a plurality (four) of first recesses 19A. The first protrusion 151A is formed integrally on a center portion of a main surface of the first case piece 11A. The first protrusion 151A is disposed at the intersection of the first protruding beads 152A, which extend from the first protrusion 151A toward four corners of the first case piece 11A. As seen in FIG. 3, the first protrusion 151A protrudes outward from the first protruding beads 152A, with a height H1 with respect to the first protruding beads 152A. An outer perimeter of the main surface of the first case piece 11A is formed to have the same height as the first protruding bead portion 152A. The first recesses 19A have a lower height than the first protruding beads 152A. The first recesses 19A are formed in the main surface such that the first recesses 19A are surrounded by the outer perimeter and the first protruding beads 152A. The first protrusion 151A, the first protruding beads 152A and the first recessions 19A together constitute the first elastically deforming structure 15A.

The second case piece 12A is basically symmetrical to the first case piece 11A with respect to the dividing line in the middle of the side face. The second case piece 12A also includes a second protrusion 161A, a plurality (four) of second protruding beads or ribs 162A, a plurality (four) of second recesses 20A. These features are hidden in FIGS. 1 and 2, but shown in the cross sectional view of FIG. 3. The second protrusion 161A is formed integrally on a center portion of a main surface of the second case piece 12A. The second protrusion 161A is disposed at the intersection of the second protruding beads 162A, which extend from the second protrusion 161A toward four corners of the second case piece 12A. As seen in FIG. 3, the second protrusion 161A protrudes outward from the second protruding beads 162A, with a height H1 with respect to the second protruding beads 162A. An outer perimeter of the main surface of the second case piece 12A is formed to have the same height as the second protruding beads 162A. The second recesses 20A have a lower height than the second protruding beads 162A. The second recesses 20A are formed in the main surface such that the second recesses 20A are surrounded by the outer perimeter and the second protruding beads 162A. The second protrusion 161A, the second protruding beads 162A and the second recesses 20A together constitute the second elastically deforming structure 16A.

When the battery modules 1A to 1H, 1J, 1K, 1X, and 1Y are stacked on one another as shown in FIG. 4, the first protrusion 151A of the first elastically deforming structure 15A provided on the main surface of first case piece 11A abuts against a second protrusion 161X of the second elastically deforming structure 16X formed on a main surface of the second case piece 12X of the battery module 1X that is arranged in front side of the battery module 1A. The first recesses 19A work in conjunction with the first buffer parts 17A and the second recesses 20A work in conjunction with the second buffer parts 18A to form spaces S serving as a cooling air passages as seen in FIG. 6. The first protruding beads 152A extending toward four corners from the first protrusion 151A function as rigid beams of the first elastically deforming structure 15A. The first protruding beads 152A enable a uniform surface pressure to be applied to a single laminated battery cell body 23A when the entire main face undergoes elastic deformation. With this arrangement, which will be explained in more detail later, the entire stack of battery modules 1A to 1H, 1J, 1K, 1X, and 1Y deforms elastically as shown in FIG. 6. By applying pressure to the battery cell body 23A housed inside the module cluster 1M, a stable charging/discharging performance can be obtained.

Similarly, when the battery modules 1A to 1H, 1J, 1K, 1X, and 1Y are stacked on one another as shown in FIG. 4, the second protrusion 161A of the second elastically deforming structure 16A provided on the opposite main surface not visible in FIG. 1 abuts against the first protrusion 151B of the first elastically deforming structure 15B formed on the main face of the battery module 1B that is arranged on the opposite side of the battery module 1A. The second protruding beads 162A extending toward four corners from the second protrusion 161A function as rigid beams of the second elastically deforming structure 16A and enable a uniform surface pressure to be applied to the battery cell body 23A when the entire main face undergoes elastic deformation. With this arrangement, the entire stack of battery modules deforms elastically as shown in FIG. 6 (the battery module 1B is omitted in FIG. 6). By applying pressure to the battery cell body 23A housed inside, a stable charging/discharging performance can be obtained.

As shown in FIG. 4, the battery modules 1X and 1Y are positioned at the end portions of the battery module cluster 1M, and an end plate or other rigid body is provided on each of both ends. A first end plate is provided on the end of the battery module cluster 1M (shown in the foreground in FIG. 4) so as to abut against the first protrusion 151X of the first elastically deforming structure 15X of the battery module 1X. Similarly, a second end plate is provided on the opposite end of the battery module cluster 1M so as to abut against the second protrusion 161Y of the second elastically deforming structure 16Y of the battery module 1Y. As a result, the entire cluster undergoes elastic deformation as shown in FIG. 6. By applying pressure to the battery cell body 23A housed inside each of the battery modules 1A to 1H, 1J, 1K, 1X, and 1Y, a stable charging/discharging performance can be obtained. However, since a pressure applying effect is obtained when either one of the first and second elastically deforming structures is deformed, it is acceptable to omit the end plates from both ends of the battery module cluster 1M such that the first elastically deforming structure 15X of the battery module 1X and the second elastically deforming structure 16Y of the battery module 1Y do not undergo elastic deformation. It is also acceptable to omit the first elastically deforming structure 15X and the second elastically deforming structure 16Y altogether.

Figure 5:
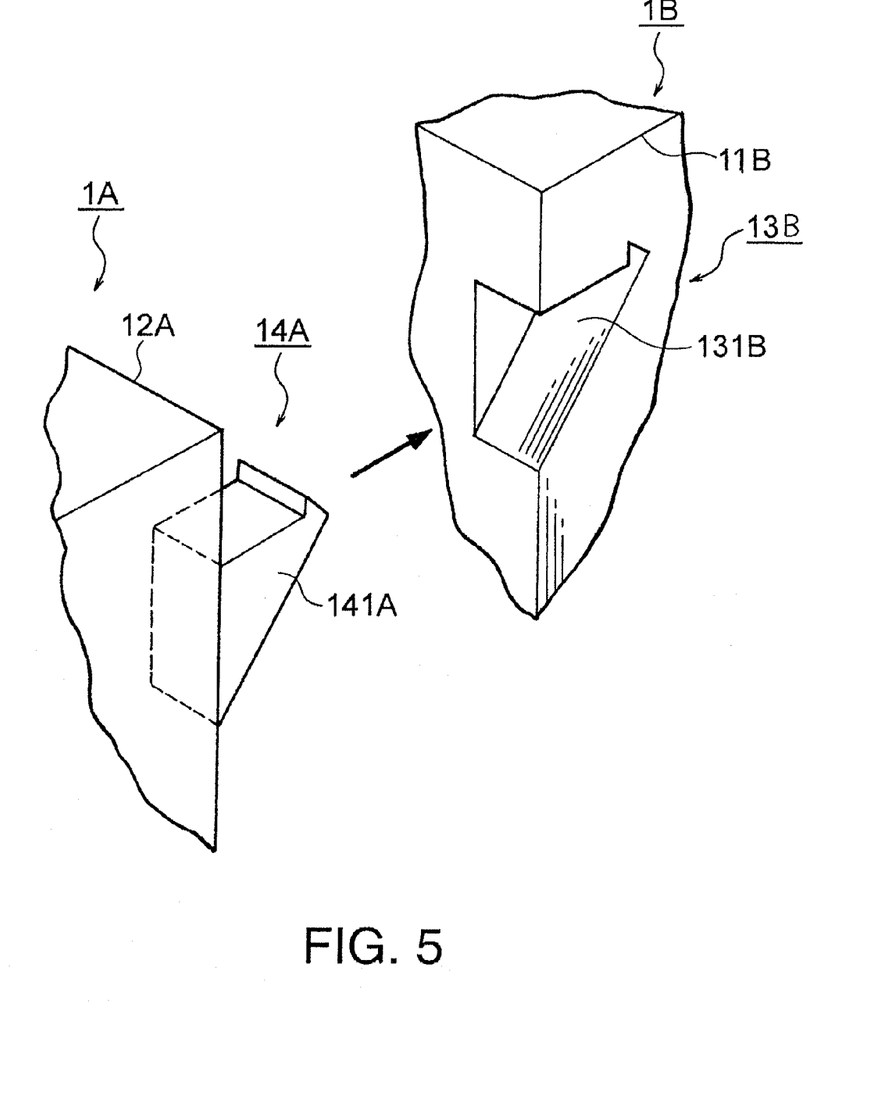
FIG. 5 is an enlarged perspective view showing a coupling structure between a pair of adjacent ones of the battery modules illustrated in FIG. 1.

As shown in the enlarged view of FIG. 5, the first battery module coupling structure 13B includes a first coupling acceptor 131B, while the second battery module coupling structure 14A includes a second coupling projection 141A. The coupling projection 141A is formed on each of the four corners of the case piece 12A (the coupling projection 141A is hidden in FIG. 1 and partially hidden in FIG. 2). The coupling acceptor 131B is formed on each of the four corners of the case piece 11B. The coupling projections 141A are configured to engage in a one-touch fashion with the coupling acceptors 131B of the adjacent battery module 1B when the battery modules 1A to 1H, 1J, 1K, 1X, and 1Y are stacked as shown in FIG. 4 such that a battery module 1A is coupled to the adjacent battery module 1B. Each of the coupling projection 141A has a key-shaped portion formed on a tip end thereof. The key-shaped portion is configured to engage with a key-shaped recess formed in the corresponding one of the coupling acceptors 131B of the battery module 1B such that the coupling projections 141A and the coupling acceptors 131B are coupled together. In the illustrated embodiment, the first coupling acceptors and the first buffer parts can be collectively referred to as a first battery module coupling structure, and the second coupling projections and the second buffer parts can be collectively referred to as a second battery module coupling structure for each of the corresponding ones of the battery modules 1A to 1H, 1J, 1K, 1X, and 1Y.

Meanwhile, when the battery modules 1A to 1H, 1J, 1K, 1X, and 1Y are stacked on one another as shown in FIG. 4, the coupling receptors 131A at the four corners of the case piece 11A engage with corresponding ones of the coupling projections of the adjacent battery module 1X (having the same shape as the coupling projection 141A of the battery module 1A shown in FIG. 5) such that the battery module 1A and the battery module 1X are coupled together.

The coupling acceptors 131A have the same shape as the coupling acceptor 131B of the battery module 1B shown in FIG. 5. In short, the coupling acceptors 131A are formed on the four corners of the foreground-side main faces of the battery modules 1A to 1H, 1J, 1K, 1X, and 1Y and the coupling projections 141A are formed in the four corners of the opposite-side main faces of the same such that the coupling acceptors 131 and the corresponding coupling projections 141 formed on the opposing main faces of adjacent battery modules can engage with one another and, thereby, couple the adjacent battery modules together at the four corners.

As seen in FIG. 1, the first buffer parts 17A are formed on the two short sides of the foreground-side main face of the battery module 1A. As seen in FIG. 3, the first buffer parts 17A protrude outward by a height dimension H2 from the main face of the case piece 11A. The height dimension H2 of the first buffer part 17A is less than the height dimension H1 of the first protrusion 151A (i.e., H2<H1). The first buffer part 17A is made of a flexible material (e.g., elastomeric material—rubber or elastomer) that has a lower elasticity modulus (more elastic) than the plastic resin material of the case piece 11A. In this way, the flexible material of the first buffer part 17A is relatively a soft material with a low surface hardness (low stiffness) as compared to the plastic resin material of the case piece 11A. In other words, the first buffer parts 17A are formed of a more elastic material than a material forming the first elastically deforming structure 15A. The first buffer parts 17A can be formed as an integral unit with the case piece 11A by using, for example, a doubling molding method with the plastic resin material forming the case piece 11A and the rubber or elastomer forming the first buffer part 17A.

During stacking of the battery modules 1A and 1X, the first and second protrusions 151A and 161A of the opposed main faces of the cases C of the battery modules 1A and 1X will initially contact each other before the first and second buffer parts 17A and 18X contact each other. Thus, further movement of the cases C of the battery modules 1A and 1X together will cause the opposed main faces of the cases C of the battery modules 1A and 1X to elastically deformed inward toward the battery cell bodies. Once with the first and second buffer parts 17A and 18X contact each other, the first and second buffer parts 17A and 18X will begin to compress prior to the coupling projections of the case piece 11A fully mating (coupling) with the coupling acceptors of the case piece 12X. Accordingly, the first elastically deforming structure 15A of the case piece 11A will not compress during stacking and coupling of the battery modules 1A and 1X, but rather the main surface of the case piece 11A will bend (elastically deform) inward against the battery cell body 23A. However, the overall force to compress the buffer parts 17A is greater than the overall force needed to deform the first elastically deforming structure 15A such that the first and second buffer parts 17A and 18X applies a force to firmly retain the coupling projections of the case piece 11A in contact with the coupling acceptors of the case piece 12X.

When the coupling acceptor 131A of the battery module 1A is engaged with the coupling projection of the battery module 1X such that the battery module 1A and the battery module 1X are coupled together, the first buffer part 17A abuts against an opposing second buffer part 18X formed on the battery module 1X as shown in FIG. 6 and spaces S develop between the main face of the case piece 11A of the battery module 1A and the main face of the case piece 12X of the battery module 1X as elastic deformation occurs.

As a result, cooling air blown from an external cooling apparatus can be passed through the spaces S between the battery modules 1A and 1X and the cooling efficiency of the battery modules 1A and 1X can be increased. Simultaneously, the elastic force of the first buffer part 17A strengthens the coupling between the coupling projections and the coupling acceptors and ensures the elastic deformation of the first elastically deforming structure 15A.

In this embodiment, in order to form the cooling air spaces S, the heights H2 of the first and second buffer parts 17A and 18X are set to be smaller than the heights H1 of the first and second protrusions 151A and 161A. In this way, during stacking of the battery modules 1A and 1X, the opposed main faces of the cases C of the battery modules 1A and 1X are deformed inwardly towards the battery cell bodies while the first and second buffer parts 17A and 18X hold the edges of the main face of the case C of the battery module 1A away from the edges of the main face of the case C of the battery module 1X. Also the first buffer part 17A is more elastic than an elasticity of the first elastically deforming structure 15A. If the elasticity of the first buffer part 17A is much smaller than the elasticity of the first elastically deforming structure 15A, then the cooling air spaces S can be reliably obtained and the connection between the coupling protrusion and the coupling acceptor of the battery modules 1A and 1X is strengthened. Also if the elastic deformation of the first elastically deforming structure 15A can be ensured, then the height H2 of the first buffer parts 17A can alternatively be set to be the same as or larger than the height H1 of the first protrusion 151A.

Although in this embodiment the first buffer parts 17A are configured to span in a continuous fashion on both short sides of the case piece 11A, it is acceptable for the first buffer parts 17A to be configured as dispersed (intermittent) parts and/or provided on both the long sides so long as the cooling air spaces S can be formed.

Although hidden in FIGS. 1 and 2, the second buffer parts 18A are formed on both short sides of a main face of the case piece 12A on the other side of the battery module 1A. The second buffer parts 18A are configured to protrude outward from the main face with the height H2. The height dimension H2 of the second buffer parts 18A is less than the height dimension H1 of the second protrusion 161A (i.e., H2<H1). Thus, the structure and deformation of the second buffer parts 18A are the same as those of the first buffer parts 17A.

As mentioned above, the battery modules 1B to 1H, 1J, 1K, 1X, and 1Y have the same structure as the battery module 1A of FIG. 1. The battery modules 1A to 1H, 1J, 1K, 1X, and 1Y are all stacked onto one another as shown in FIGS. 4 and 6 such that the coupling projections and the coupling acceptors provided on opposing main faces of adjacent battery modules 1B to 1H, 1J, 1K, 1X, and 1Y are engaged with each other as shown in FIG. 5. In this way, the battery module cluster 1M is formed. In the explanation that follows, the reference letters will be omitted and only the reference numerals will be used to refer to the parts of the battery modules unless a part of a particular battery module is to be indicated.

The coupling projections 141 and the coupling acceptors 131 provided on four corners of the main faces of the battery modules 1 are configured such that they can be engaged with a one-touch coupling operation. As a result, separate parts can be omitted and cost reducing effect can be obtained due to a reduced number of parts. Since the first buffer parts 17 of one battery module 1 touch against the second buffer parts 18 of the adjacent battery module 1 and the buffer parts 17B and 18A press against each other such that a repelling force exists. The engagement between the coupling protrusion 141 and the coupling acceptor 131 is strengthened further and the battery modules 1 can be prevented from coming apart due to vibrations when the battery module cluster 1M is mounted in a vehicle.

When the four corners of the main faces of the battery modules 1 are engaged through the coupling projections 141 and the coupling acceptors 131, the first protrusion 151 of one battery module 1 touches against the second protrusion 161 of the other battery module 1 as shown in FIG. 6 and the protrusions 151 and 161 press against each other such that a repelling force exists. As a result, the first elastically deforming structures 15 and the second elastically deforming structures 16 elastically deform in the direction of the arrows shown in Figure due 6 to the elastic properties of the case pieces 11 and 12, and a surface pressure is applied to the single laminated cell body 23 stored inside the case C.

The first protruding beads 152 extend outward from the first protrusion 151 towards the outer perimeter of the case C and the second protruding beads 162 are configured to extend radially outward from the second protrusion 161. Consequently, the first and second protruding beads 152 and 162 provide a rigid beam effect such that a uniform surface pressure is applied to the single laminated cell body 23.

Additionally, since the first buffer parts 17 and the second buffer parts 18 cause spaces S to be formed between the opposing main faces of adjacent battery modules 1, cooling air supplied from a cooling apparatus (not shown) can be blown through the spaces S such that the single laminated cell body 23 can be cooled. Since the recesses 19 and 20 are formed in portions of the main faces of the case pieces 11 that contact the single laminated cell body 23, the spaces S can be made larger while reducing the thickness of the main faces contacting the single laminated cell body 23, thereby increasing the cooling effect of the cooling air.

Figure 7:
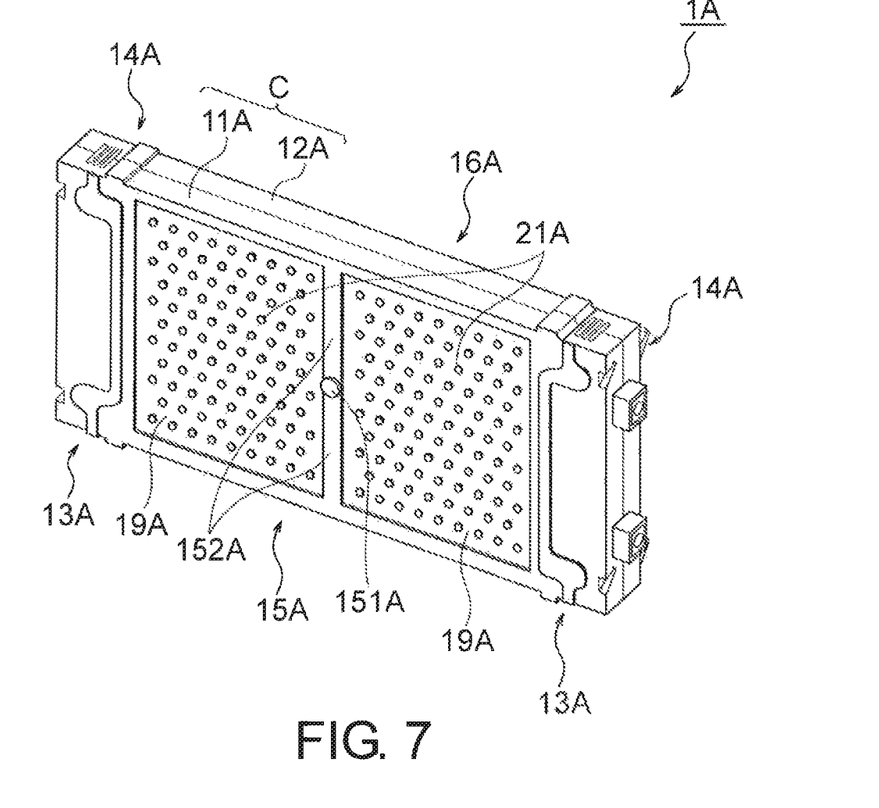
FIG. 7 is a perspective view of a single battery module in accordance with another embodiment.
Figure 8:
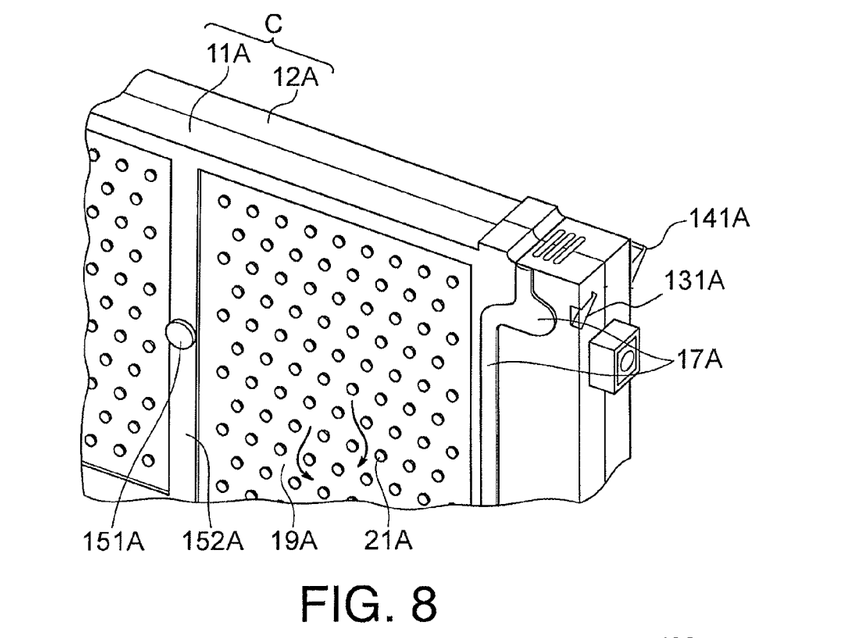
FIG. 8 is an enlarged partial perspective view of a corner portion of the battery module illustrated in FIG. 7.
Figure 9:
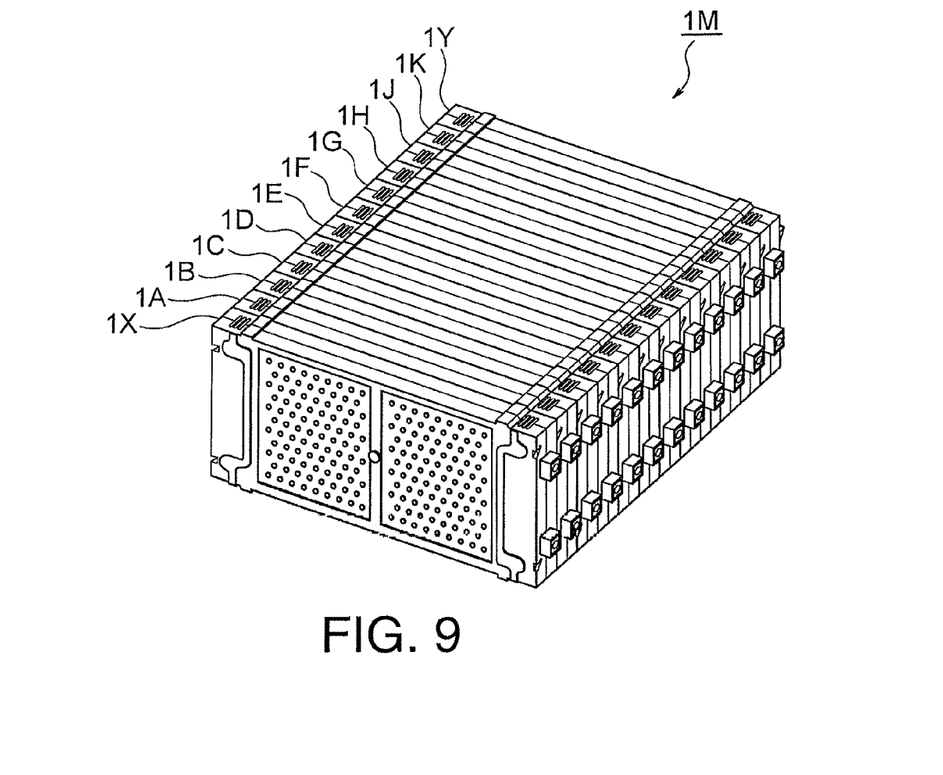
FIG. 9 is a perspective view of a battery module cluster or assembly comprising a plurality of the battery modules illustrated in FIG. 7.

Referring now to FIGS. 7 to 9, a battery module in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. FIG. 7 is a perspective view of the single battery module in accordance with second embodiment. FIG. 8 is an enlarged partial perspective view of a corner portion of the battery module illustrated in FIG. 7. FIG. 9 is a perspective view of a battery module cluster comprising a plurality of the battery modules illustrated in FIG. 7.

The shape of the first protruding beads or ribs 152A of the first elastically deforming structure 15A and the shape of the first recesses 19A are both different in this embodiment from the battery module 1A of the previous embodiment. In this embodiment, the first protruding beads 152A comprise two beads extending toward the long sides from the first protrusion 151A. The first recessions 19A are rectangular and arranged on the left and right of the first protruding beads 152A.

This embodiment also differs from the previous embodiment in that first protruding flow guides 21A having a smaller height than the first protrusion 151A are formed in a regular arrangement on the entirety of each of the first recessions 19A. The case piece 12A on the other side of the battery module 1A has the same structure and includes the second protrusion, the second protruding beads, the second recesses, and the second protruding flow guides having a smaller height than the second protrusion. Otherwise, the constituent features are the same as the first embodiment and explanations thereof are borrowed from the first embodiment.

Similarly to the first embodiment, the battery modules 1B to 1H, 1J, 1K, 1X, and 1Y of this second embodiment are the same as the battery module 1A of this second embodiment. The battery modules 1A to 1H, 1J, 1K, 1X, and 1Y of this second embodiment are stacked onto one another as shown in FIG. 9 such that the coupling projections 141 and the coupling acceptors 131 provided on opposing main faces of adjacent battery modules 1 are engaged with each other as shown in FIG. 5. In this way, a battery module cluster 1M is formed.

The coupling projections 141 and the coupling acceptors 131 provided on four corners of the main faces of the battery modules 1 are configured such that they can be engaged with a one-touch coupling operation. As a result, separate parts can be omitted and cost reducing effect can be obtained due to a reduced number of parts.

Since the first buffer parts 17 of one battery module 1 of this second embodiment touches against the second buffer parts 18 of an adjacent battery module 1 of this second embodiment and the buffer parts 17 and 18 press against each other such that a repelling force exists, the engagement between the coupling protrusion 141 and the coupling acceptor 131 is strengthened further and the battery modules can be prevented from coming apart due to vibrations when the battery module cluster 1M is mounted in a vehicle.

When the four corners of the main faces of the battery modules 1 of this second embodiment are engaged through the coupling projections 141 and the coupling acceptors 131, the first protrusion 151 of one battery module 1 touches against the second protrusion 161 of the other battery module 1 (as shown in FIG. 6 regarding the first embodiment) and the protrusions 151 and 161 press against each other such that a repelling force exists. As a result, the first elastically deforming structure 15 and the second elastically deforming structure 16 elastically deform in the direction of the arrows shown in FIG. 6 due to the elastic properties of the case pieces 11 and 12 of this second embodiment, and a surface pressure is applied to the single laminated cell body 23 stored inside the casing C of this second embodiment.

The first protruding beads 152 of this second embodiment extend radially outward from the first protrusion 151, and the second protruding beads of this second embodiment extend radially outward from the second protrusion. Consequently, the first and second protruding beads 152 and 162 provide a rigid beam effect such that a uniform surface pressure is applied to the single laminated cell body 23.

Additionally, since the first buffer parts 17 and the second buffer parts 18 cause spaces S to be formed between the opposing main faces of adjacent battery modules 1, cooling air supplied from a cooling apparatus (not shown) can be blown through the spaces S such that the single laminated cell body 23 can be cooled.

Since the recesses 19 and 20 are formed in portions of the main faces of the case pieces 11 that contact the single laminated cell body 23, the spaces S can be made larger while reducing the thickness of the main faces contacting the single laminated cell body 23, thereby increasing the cooling effect of the cooling air.

In this second embodiment, the first protruding flow guides 21 and the second protruding flow guides 22 protrude into the spaces S so as to face one another. Cooling air introduced into the spaces S collides with the first protruding flow guides 21 and the second protruding flow guides 22 such that the flow is organized into zigzagging paths. As a result, the surface area contacted by the cooling air is increased and the cooling effect is increased.

Figure 10:
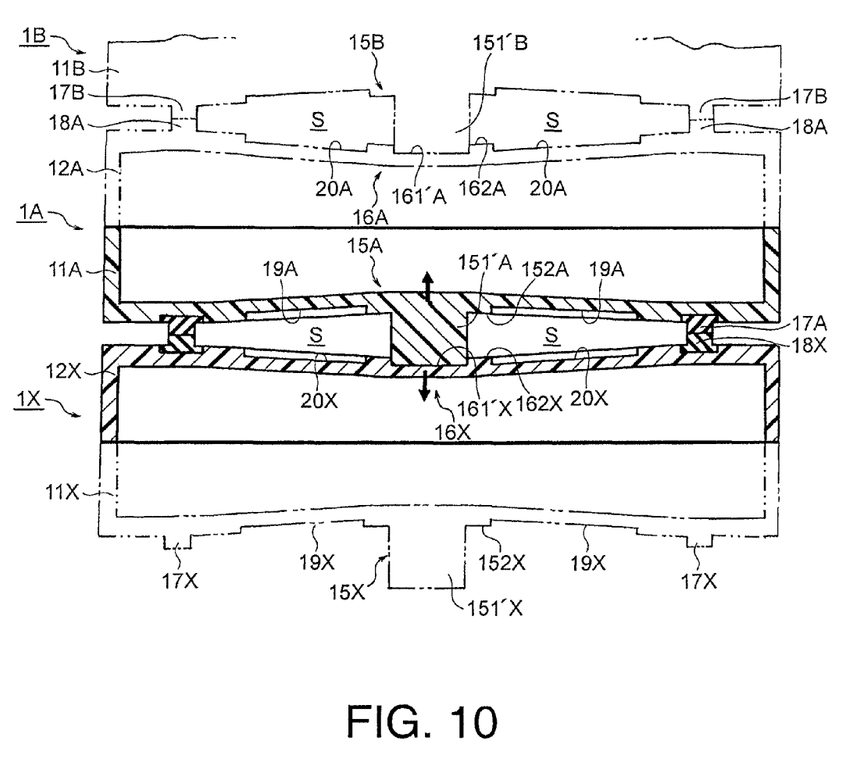
FIG. 10 is a longitudinal cross sectional view a portion of a battery module cluster or assembly comprising a plurality of battery modules according to still another illustrated embodiment in a stacked state.

Referring now to FIG. 10, a battery module in accordance with a third embodiment will now be explained. In view of the similarity between the prior embodiments and this third embodiment, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. FIG. 10 is a longitudinal cross sectional view a portion of a battery module cluster comprising a plurality of battery modules according to the third illustrated embodiment in a stacked state.

The battery module 1A in this third embodiment is different from the previous embodiments in that the second elastically deforming structure 16A has a protrusion receiving recess 161'A instead of a second protrusion 161A and the first elastically deforming structure 15A has a first protrusion 151'A that is configured to be long enough to engage with a protrusion receiving recess 161'X of the second elastically deforming structure 16X of the adjacent battery module 1X.

Thus, when the battery module 1A and the adjacent battery module 1X are stacked together in this third embodiment, a tip end of the first protrusion 151'A of the first elastically deforming structure 15A engages with the protrusion receiving recess 161'X of the second elastically deforming structure 16X of the battery module 1X and applies a pushing force against the protrusion receiving recess 161'X. Similarly, when the battery module 1A and an adjacent battery module 1B are stacked together in this third embodiment, the third recess 161'A of the second elastic deforming section 16A of the battery module 1A engages with the tip end of a first protrusion 151'B of the first elastically deforming structure 15B of the battery module 1B and receives a pushing force from the first protrusion 151'B. Otherwise, the constituent features are the same as the first embodiment. Explanations of the same features in the first and third embodiment are omitted for the sake of brevity.

Similarly to the first embodiment, the battery modules 1B to 1H, 1J, 1K, 1X, and 1Y of this third embodiment are the same as the battery module 1A of this third embodiment. The battery modules 1A to 1H, 1J, 1K, 1X, and 1Y of this third embodiment are stacked onto one another as shown in FIG. 9 such that the coupling projections 141 and the coupling acceptors 131 provided on opposing main faces of adjacent battery modules 1 are engaged with each other as shown in FIG. 5. In this way, a battery module cluster 1M is formed.

When the four corners of the main faces of the battery modules 1 are engaged through the coupling projections 141 and the coupling acceptors 131, the first protrusion 151' of one battery module 1 engages with the protrusion receiving recess 161' of another battery module 1 (as shown in FIG. 10 regarding the first embodiment) and the first protrusions 151' and the protrusion receiving recesses 161' press against each other such that a repelling force exists. As a result, the first elastically deforming structure 15 and the second elastically deforming structure 16 elastically deform in the direction of the arrows shown in the same figure due to the elastic properties of the case pieces 11 and 12, and a surface pressure is applied to the single laminated cell body 23 stored inside.

The engagement of the first protrusion 151' of one battery module 1 with the protrusion receiving recess 161' of another adjacent battery module 1 fixes the positions of the two adjacent battery modules 1 with respect to each other and enables shifting of the individual battery modules making up the stacked cluster to be suppressed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery module comprising:
a battery cell; and
a case housing the battery cell, the case including a first main face, a second main face, a first battery module coupling structure and a first elastically deforming structure,
the first battery module coupling structure being arranged and configured to retain a first additional battery module over the first main face,
the first elastically deforming structure being arranged and configured with respect to the first main face to elastically deform inward towards the second main face upon stacking the first additional battery module onto the first main face while the first additional battery module is retained to the first main face of the case by the first battery module coupling structure.

2. The battery module as recited in claim 1, wherein the case includes a second battery module coupling structure having a complementary configuration to the first battery module coupling structure, with the second battery module coupling structure being configured to couple to a second additional battery module over the second main face of the battery module.

3. The battery module as recited in claim 1, wherein the case includes a second elastically deforming structure that is arranged and configured with respect to the second main face to elastically deform inward towards the first main face, with the second elastically deforming structure having an identical configuration to the first elastically deforming structure.

4. The battery module as recited in claim 1, wherein the case includes a second elastically deforming structure that is arranged and configured with respect to the second main face to elastically deform inward towards the first main face, with the second elastically deforming structure having a mating configuration with respect to a shape of the first elastically deforming structure.

5. The battery module as recited in claim 1, wherein the first battery module coupling structure includes a buffer part disposed on the first main face such that the buffer part is arranged between the first main face of the battery module and a corresponding main face of the first additional battery module while the first additional battery module is retained to the first main face of the case by the first battery module coupling structure, the buffer part being formed of a more elastic material than a material forming the first elastically deforming structure.

6. The battery module as recited in claim 1, wherein the first elastically deforming structure includes a first protrusion protruding outwardly from the first main face in a battery module stacking direction, and the first elastically deforming structure includes a protruding bead with the protruding bead having a lower maximum height in the battery module stacking direction than a maximum height of the first protrusion, the protruding bead extends along the first main face from the first protrusion in a direction toward an outer perimeter of the first main face.

7. The battery module as recited in claim 4, wherein the first elastically deforming structure includes a first protrusion protruding outwardly from the first main face in a battery module stacking direction, and the second elastically deforming structure includes a protrusion receiving recess having a mating configuration with respect to a shape of the first protrusion.

8. The battery module as recited in claim 6, wherein the first main face includes a first recess located in a position that is offset from the first protrusion and the protruding bead.

9. The battery module as recited in claim 8, wherein the first main face includes a protruding flow guide that is formed on a recessed surface defining the first recess, with the protruding flow guide protruding outwardly from the recessed surface in the battery module stacking direction and the protruding flow guide having a lower maximum height in the battery module stacking direction than a maximum height of the first protrusion.

10. The battery module as recited in claim 3, wherein the first elastically deforming structure is formed of a plastic resin material provided on the first main face, and the second elastically deforming structure is formed of a plastic resin material provided on the second main face.

11. The battery module as recited in claim 5, wherein the buffer part is formed of an elastomeric material.

12. A battery assembly comprising:
a first battery module including a first case housing a first battery cell, with the first case including a first main face and a second main face; and
a second battery module including a second case housing a second battery cell, the second case including a first main face and a second main face,
the first and second battery modules being stacked in a battery module stacking direction, with the first main face of the first battery module face overlying the second main face of the second battery module,
each of the first and second cases include, a first battery module coupling structure, a second battery module coupling structure, a first elastically deforming structure, and a second elastically deforming structure,
the first battery module coupling structure of the first battery module engaged with the second battery module coupling structure of the second battery module such that the first and second battery modules are retained together with the second main face of the second battery module over the first main face of the first battery module,
the first elastically deforming structure of the first battery module and the second elastically deforming structure of the second battery module contacting each other and elastically deforming in the battery module stacking direction towards the first and second battery cells, respectively.

13. The battery module as recited in claim 2, wherein the case includes a second elastically deforming structure that is arranged and configured with respect to the second main face to elastically deform inward towards the first main face, with the second elastically deforming structure having an identical configuration to the first elastically deforming structure.

14. The battery module as recited in claim 2, wherein the case includes a second elastically deforming structure that is arranged and configured with respect to the second main face to elastically deform inward towards the first main face, with the second elastically deforming structure having a mating configuration with respect to a shape of the first elastically deforming structure.

15. The battery module as recited in claim 2, wherein the first battery module coupling structure includes a buffer part disposed on the first main face such that the buffer part is arranged between the first main face of the battery module and a corresponding main face of the first additional battery module while the first additional battery module is retained to the first main face of the case by the first battery module coupling structure, the buffer part being formed of a more elastic material than a material forming the first elastically deforming structure.

16. The battery module as recited in claim 2, wherein the first elastically deforming structure includes a first protrusion protruding outwardly from the first main face in a battery module stacking direction, and the first elastically deforming structure includes a protruding bead with the protruding bead having a lower maximum height in the battery module stacking direction than a maximum height of the first protrusion, the protruding bead extends along the first main face from the first protrusion in a direction toward an outer perimeter of the first main face.

17. The battery module as recited in claim 3, wherein the first battery module coupling structure includes a buffer part disposed on the first main face such that the buffer part is arranged between the first main face of the battery module and a corresponding main face of the first additional battery module while the first additional battery module is retained to the first main face of the case by the first battery module coupling structure, the buffer part being formed of a more elastic material than a material forming the first elastically deforming structure.

18. The battery module as recited in claim 3, wherein the first elastically deforming structure includes a first protrusion protruding outwardly from the first main face in a battery module stacking direction, and the first elastically deforming structure includes a protruding bead with the protruding bead having a lower maximum height in the battery module stacking direction than a maximum height of the first protrusion, the protruding bead extends along the first main face from the first protrusion in a direction toward an outer perimeter of the first main face.

19. The battery module as recited in claim 4, wherein the first battery module coupling structure includes a buffer part disposed on the first main face such that the buffer part is arranged between the first main face of the battery module and a corresponding main face of the first additional battery module while the first additional battery module is retained to the first main face of the case by the first battery module coupling structure, the buffer part being formed of a more elastic material than a material forming the first elastically deforming structure.

20. The battery module as recited in claim 4, wherein the first elastically deforming structure includes a first protrusion protruding outwardly from the first main face in a battery module stacking direction, and the first elastically deforming structure includes a protruding bead with the protruding bead having a lower maximum height in the battery module stacking direction than a maximum height of the first protrusion, the protruding bead extends along the first main face from the first protrusion in a direction toward an outer perimeter of the first main face.

\* \* \* \* \*